United States Patent
Baba et al.

(10) Patent No.: US 7,389,367 B2
(45) Date of Patent: Jun. 17, 2008

(54) METHOD OF MANAGING I/O INTERFACE MODULES IN A COMPUTER SYSTEM

(75) Inventors: Takashige Baba, Kodaira (JP); Toshiaki Tarui, Sagamihara (JP); Yoshifumi Takamoto, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 548 days.

(21) Appl. No.: 11/053,260

(22) Filed: Feb. 9, 2005

(65) Prior Publication Data

US 2005/0267963 A1 Dec. 1, 2005

(30) Foreign Application Priority Data

Apr. 8, 2004 (JP) ............................. 2004-114011

(51) Int. Cl.
*G06F 3/00* (2006.01)
(52) U.S. Cl. ..................... 710/38; 710/36; 709/223; 709/225; 709/250
(58) Field of Classification Search .................. None
See application file for complete search history.

(56) References Cited

U.S. PATENT DOCUMENTS

2005/0005038 A1* 1/2005 Ayukawa et al. ............. 710/38

2005/0044284 A1* 2/2005 Pescatore ..................... 710/15

FOREIGN PATENT DOCUMENTS

| JP | 11-328093 | 11/1999 |
|---|---|---|
| JP | 2002-229967 | 8/2002 |

* cited by examiner

*Primary Examiner*—Alford Kindred
*Assistant Examiner*—Eron J. Sorrell
(74) *Attorney, Agent, or Firm*—Antonelli, Terry, Stout & Kraus, LLP.

(57) ABSTRACT

A method is provided for efficiently managing the connection of processor modules and input/output interface modules at a drastically reduced cost. A management server searches IFT and ST tables after receiving an instruction from the system management server to connect an input/output interface module to a processor, creates a condition list requested by the input/output interface module, and selects an input/output interface matching the condition list JL from an unassigned input/output interface module management table UNT. The management server next instructs the input/output interface switch to connect the processor with the selected input/output interface. The management server instructs the input/output device management server and the network management server to setup a connection utilizing the selected input/output interface, and rewrites the tables UNT and SPT.

10 Claims, 15 Drawing Sheets

FIG. 2

IFT

| PORT NO. | TYPE | SPEC. | IDENTIFIER | STATUS | PROCESSOR PORT NO. (CONNECTED) |
|---|---|---|---|---|---|
| 1 | NIC | 1 | MACaddr1 | USED | 7 |
| 2 | NIC | 1 | MACaddr2 | UNASSIGNED | |
| 3 | FC | 14 | WWN1 | USED | 7 |
| 4 | FC | 15 | WWN2 | UNASSIGNED | |
| 5 | FC | 15 | WWN3 | UNASSIGNED | |
| ⋮ | ⋮ | ⋮ | ⋮ | ⋮ | ⋮ |

| SERVER NO. | PROCESSOR PORT NO. (CONNECTED) | I/O INTERFACE PORT NO. | I/O INTERFACE TYPE | CONNECTION DEVICE | PROTOCOL |
|---|---|---|---|---|---|
| 1 | 7 | 1 | NIC | VLAN1 | FC |
| 1 | 7 | 3 | FC | DISK ARRAY DEVICE 1 | FC |
| 2 | 8 | | | | |
| 3 | 9 | | | | |
| ⋮ | ⋮ | ⋮ | ⋮ | ⋮ | ⋮ |

FIG. 4

UNT

| TYPE | SLOT NO. | SPEC. | CONNECTION DEVICE | PROTOCOL |
|---|---|---|---|---|
| NIC | 2 | 1 | VLAN1 | IP |
| NIC | 2 | 1 | VLAN2 | IP |
| NIC | 2 | 1 | DISK ARRAY DEVICE 1 | iSCSI |
| FC | 4 | 15 | DISK ARRAY DEVICE 1 | FC |
| FC | 4 | 15 | DISK ARRAY DEVICE 2 | FC |
| FC | 5 | 15 | DISK ARRAY DEVICE 2 | FC |
| FC | 5 | 15 | DISK ARRAY DEVICE 3 | FC |
| ⋮ | ⋮ | ⋮ | ⋮ | ⋮ |

FIG. 5

SPT

| SPEC. NO. | PRODUCT NAME | MNFR. | FC PROTOCOL | COMMAND SET | TRANSFER RATE | ... |
|---|---|---|---|---|---|---|
| 14 | FCxxx | B CORP. | X3.269-1996 | ANSI SCSI STANDARD X3.131-1994 | 2.0Gbps | |
| 15 | FCyy1 | C CORP. | X3.269-1996 | ANSI SCSI STANDARD X3.131-1994 | 2.0Gbps | |
| 16 | FCyy2 | C CORP. | X3.269-199 | ANSI SCSI STANDARD X3.131-1994 | 1.0Gbps | |
| ⋮ | ⋮ | ⋮ | ⋮ | ⋮ | ⋮ | ⋮ |

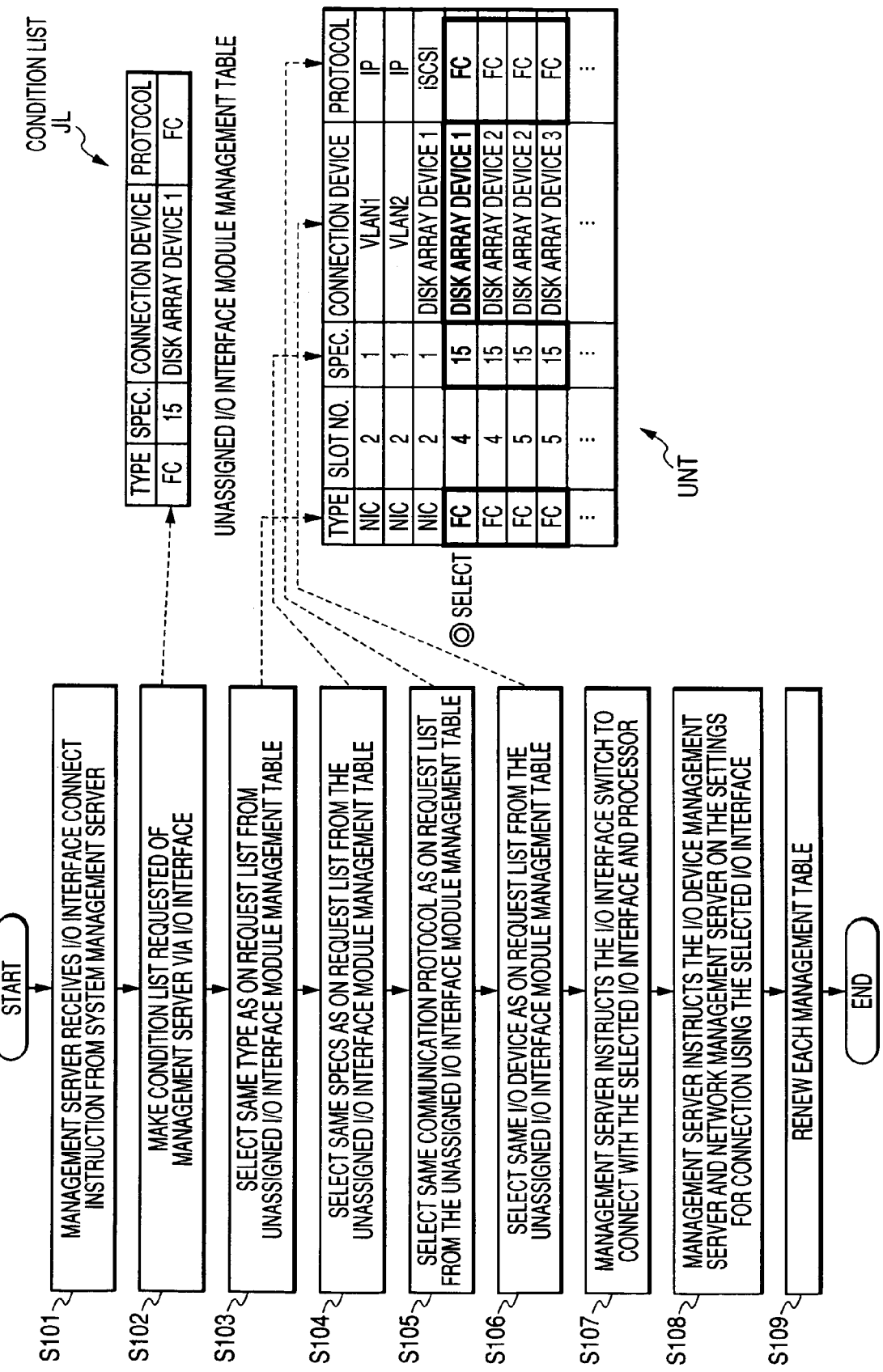

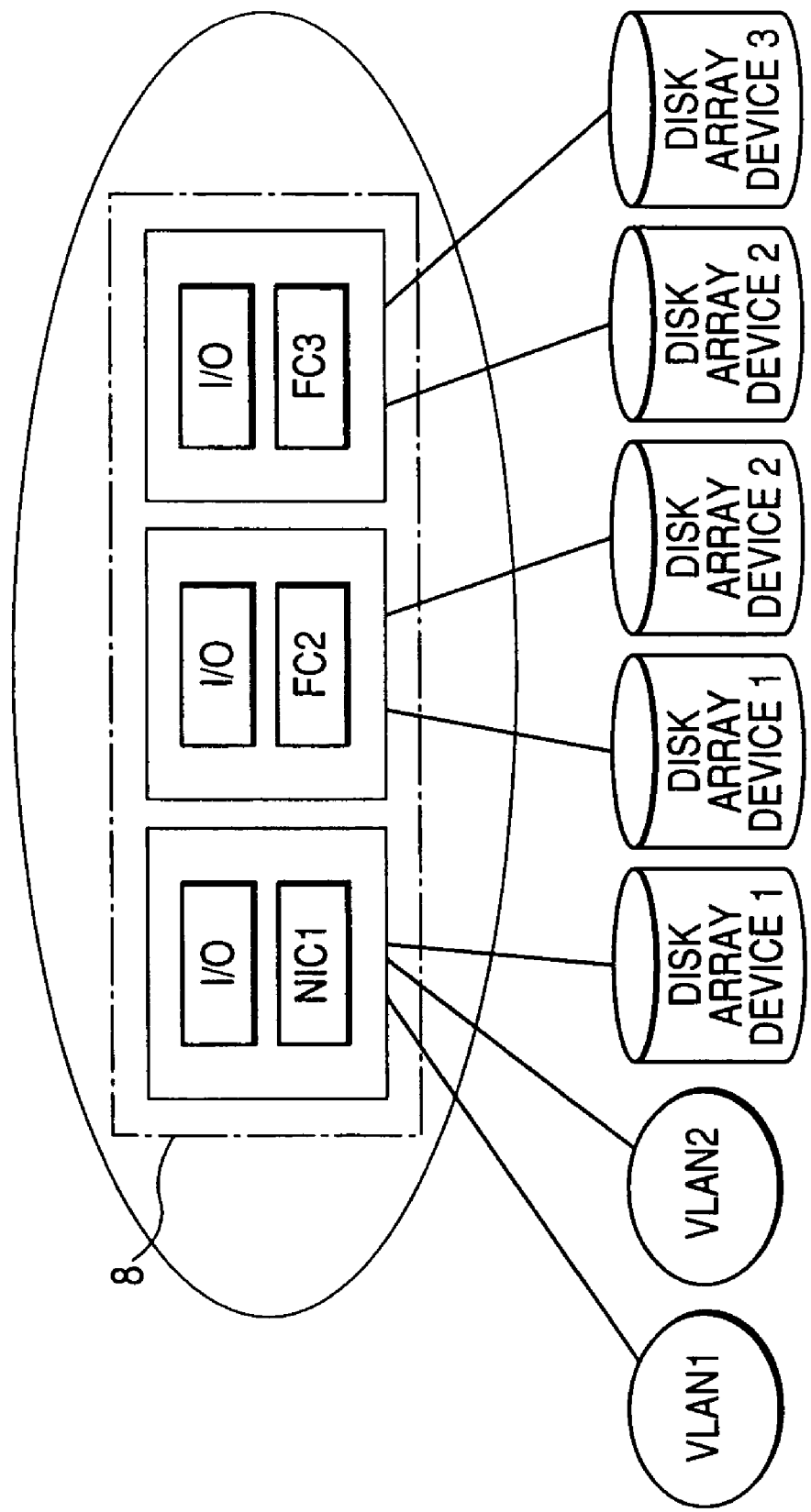

I/O INTERFACE MODULE INTERCHANGEABILITY TABLE GT

| SPEC. NO. | 14 | 15 | 16 | ..... |
|---|---|---|---|---|
| 14 |  | ○ | × | ..... |
| 15 | ○ |  | × | ..... |
| 16 | × | × |  | ..... |
| ⋮ | ⋮ | ⋮ | ⋮ |  |

METHOD OF MANAGING I/O INTERFACE MODULES IN A COMPUTER SYSTEM

CLAIM OF PRIORITY

The present application claims priority from Japanese application JP 2004-114011, filed on Apr. 8, 2004, the content of which is hereby incorporated by reference into this application.

FIELD OF THE INVENTION

The present invention relates in general to management technology for computer systems; and, more particularly, the present invention relates to a technology that is effective for managing processor modules and I/O interface modules in modular computer systems.

BACKGROUND OF THE INVENTION

Modular computer systems and so-called modular servers are known as backbone servers, and they are used for business backbone systems, for example. These modular servers are a combination of a network, a server, and a storage device, etc.

The modular server is made up of multiple CPUs (processors), a network, multiple I/O (input/output interface) modules, and an I/O switch, as well as management server modules, that are installable in an enclosure, such as a rack.

The management server controls the I/O switches based on a management table. The management server changes the combination of multiple CPUs and multiple I/O modules as needed by means of the I/O switch. The management table, for example, is made up of an I/O switch management table which identifies the I/O connection status with the CPU, and a table showing the configuration of the I/O and input/output device connected to the CPU.

The structure of a modular computer system, for example, is disclosed in JP-A No. 229967/2002 (Patent document 1)

Technology for system management by batch processing using management tables to connect I/O devices with multiple computers in a modular computer system, for example, is disclosed in JP-A No. 328093/1999 (Patent document 2).

[Patent document 1] JP-A No. 229967/2002

[Patent document 2] JP-A No. 328093/1999

However, the connection technology utilizing management tables in the above-mentioned type of modular computer systems were found to possess the following problems according to the present inventors.

Namely, when the management server is in the process of assigning an as yet unassigned I/O to a particular CPU, as requested by the system management software (policy), the only available information in the management table is the type of I/O connected to the I/O switch. The management server therefore cannot decide which unassigned I/O to select in order to connect to the requested I/O device.

Moreover, when the system management software (policy) requests the management server to connect, to a particular CPU, an I/O device having a configuration that is identical to that CPU, the management server is capable of detecting an I/O that is unassigned to the CPU, based on the management table.

However, the management table contains no information on what input/output devices are connected to each I/O and no information such as the input/output device specifications. The management server therefore cannot decide which detected I/O to select in order to connect to an input/output device with the same configuration.

Therefore, the process of making connections in a modular computer system must be performed by administrators, such as system service personnel, who make the connections manually, and this creates the problem of a drastic increase in man-hours and cost.

SUMMARY OF THE INVENTION

The present invention therefore has the object of providing technology for efficiently managing the processor module and input/output interface module connections at a drastically reduced cost by utilizing a management table.

The above-described object and other objects and novel features of the present invention will become apparent from the following description of the present invention and the accompanying drawings.

A brief description of representative aspects of the present invention as disclosed in this specification will be presented next.

The present invention provides a modular computer system comprising processor modules containing two or more processors; one or more input/output interface modules; and an input/output interface switch for connecting the two or more processors and one or more input/output interface modules, and for establishing the connection relation between the input/output interface modules and processor modules; and a management server section which operates to control the input/output interface switch and to manage the connection relation between the input/output interface and the processor.

The present invention also provides a method for managing input/output interface modules for a computer system comprising a system management server connected to the management server section, for operating system management software to determine the configuration of the modular computer system; and an input/output device connected directly or by a network to the input/output interface module, wherein the management server includes a configuration management table for respectively managing the input/output interface module specifications and the connection status; and when selecting the input/output interface in an input/output device connection instruction issued by the system management server, the management server creates a condition list including the input/output device for connection, the type and the specifications of the input/output interface module, and the communication protocol, from the input/output device connection instruction acquired from the system management server: searches the configuration management table, selects an input/output interface module matching the condition list, instructs the input/output interface switch to change the connection between the input/output interface module and the processor, and rewrites the configuration management table based on that connection change information.

A brief description of representative effects provided by the present invention as disclosed in this specification will be presented next.

(1) The input/output interface configuration can be drastically reduced.

(2) Connection management support of the input/output interface is not required.

(3) The cost and the man-hours required for managing the computer system can be drastically reduced due to the above effects (1) and (2).

BRIEF DESCRIPTION OF THE DRAWINGS

FIG. 2 is a diagram showing an example of the input/output interface switch table used in the computer system of FIG. 1;

FIG. 3 is a diagram showing an example of the server configuration management table used in the computer system of FIG. 1;

FIG. 4 is a diagram showing an example of the unassigned input/output (I/O) interface module management table used in the computer system of FIG. 1;

FIG. 5 is a diagram showing an example of the specification management table used in the computer system of FIG. 1;

FIG. 6 is a flowchart showing the management operation that is performed when changing connections in the modular computer device installed in the computer system of FIG. 1;

FIG. 7 is a diagram showing the connection relation of the input/output (I/O) interface module indicated in the unassigned input/output (I/O) interface module management table of FIG. 6;

DETAILED DESCRIPTION OF THE PREFERRED EMBODIMENTS

Figure 1:
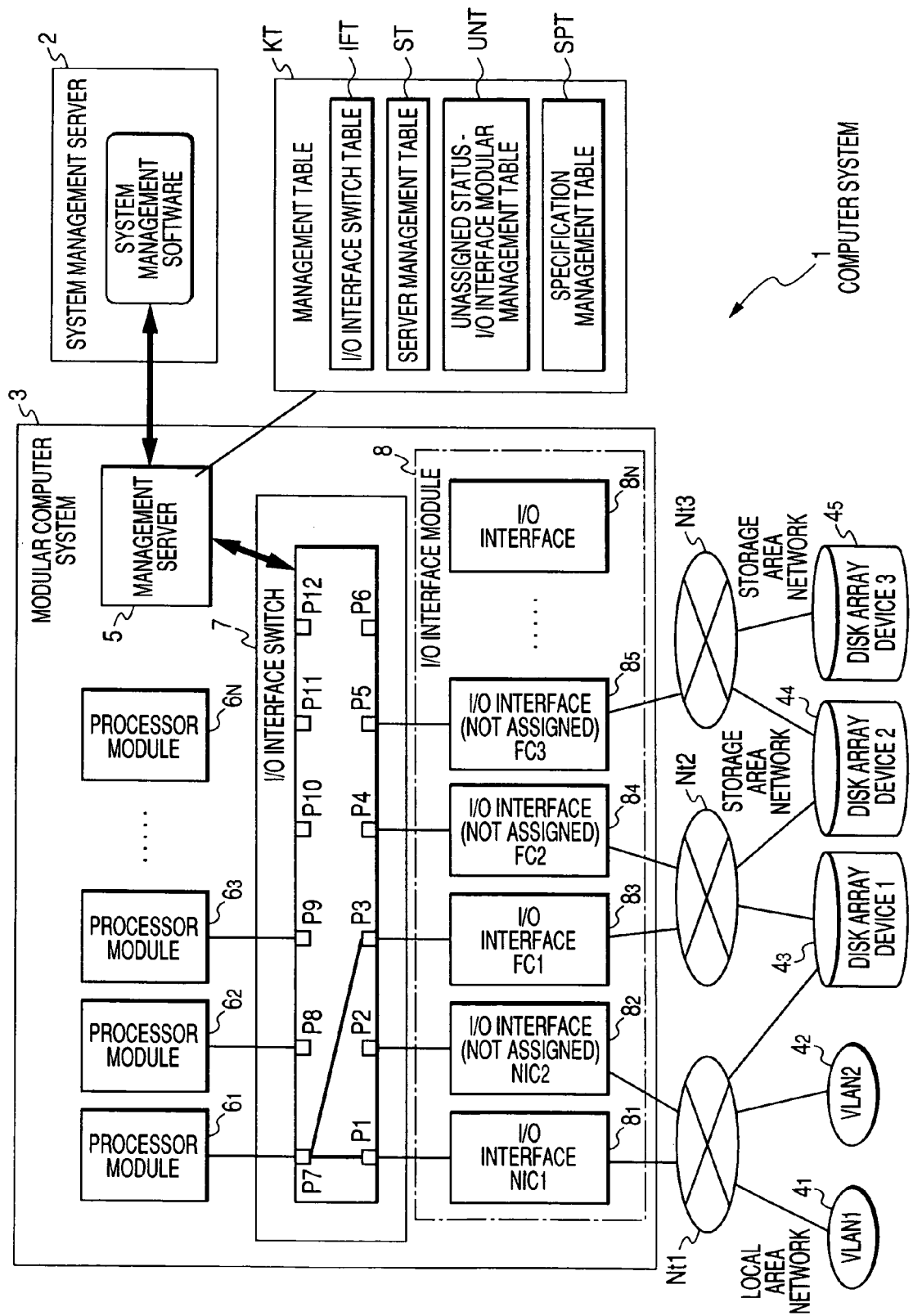
FIG. 1 is a block diagram of a computer system representing an embodiment of the present invention.

Various embodiments of the present invention will be described in detail with reference to the accompanying drawings. In all of the drawings, the same structural members are basically assigned the same reference numerals, and a redundant description thereof is omitted.

FIG. 1 is a block diagram of a computer system representing an embodiment of the present invention.

As shown in FIG. 1, a computer system 1 is made up of a system management server 2 and a modular computer system 3, as well as multiple input/output (disk array) devices $4_1$-$4_N$. The modular computer system 3 is made up of a management server 5, processor modules $6_1$-$6_N$, an I/O interface switch 7, and an I/O interface module 8.

Each processor module is comprised of one or more processors. The I/O interface module 8 is comprised of multiple I/O interfaces $8_1$-$8_N$. These modules include for example an NIC (Network Interface Card), an FC (Fiber Channel) card, and a SCSI (Small Computer System Interface) card.

The input/output (disk array) devices $4_1$-$4_N$ are comprised for example of a network, such as a VLAN (Virtual Local Area Network), and a storage module, such as a HDD (Hard Disc Drive) and disk array device, etc.

The input/output devices $4_1$-$4_N$ are respectively connected to an optional I/O interface $8_1$-$8_N$, by way of a network Nt1-Nt3, such as a LAN or SAN (Storage Area Network).

The system management server 2 is connected to the management server 5 of the modular computer system (device) 3. The system management server 2 controls the modular computer system (device) 3 based on system management software stored in the system management server 2.

When there is a request (policy) from the system management server 2, management server 5 searches the configuration management table KT stored in the management server 5 and controls the connection made by the I/O interface switch 7.

The I/O interface switch 7 contains, for example, twelve ports P1-P12. The I/O interface modules 8 are respectively connected to the ports P1-P6. The processor modules $6_1$-$6_N$ are respectively connected to the ports P7-P12. These processor modules $6_1$-$6_N$ and the I/O interface modules 8 are connected together by way of the I/O interface switch 7.

The configuration management table KT is comprised of an I/O interface switch table IFT, a server configuration management table ST, an unassigned I/O interface module management table UNT, and a spec management table SPT.

As shown in FIG. 2, the I/O interface switch table IFT is comprised of a "Port No." of a port of the I/O interface switch 7 that is connected to an I/O interface, an I/O interface "Type", such as an NIC, FC card, or SCSI card, the "Spec." (specifications) of the individual I/O interface, the "Identifier" of the individual I/O interface, the use or unassigned "Status", and a "Processor Port No. (connected)" showing the port No. of the port of the I/O interface switch 7 through which connection is made to a processor.

As shown in FIG. 3, the server management table ST is comprised of a "Server No." showing the number of the individual processor, the "Processor Port No. (connected)" showing the port number of the port of the I/O interface switch 7 to which the processor is connected, the "I/O Interface Port No. (connected)" showing the I/O interface port number of the port of the I/O interface switch 7 through which connection is made to an I/O interface, the "I/O interface type (connected)" showing the type of the connected I/O interface, the "Connection device", such as the HDD and disk array device, and the "Protocol".

As shown in FIG. 4, the unassigned I/O interface module management table UNT is comprised of a "Type", "Slot No.", "Spec.", "Connection device" and "Protocol" for the I/O interface.

As shown in FIG. 5, the specification (spec.) management table SPT is comprised of a "Spec. No.", a "Product Name", a "Mnfr.", an "FC Protocol", a "Command Set", and a "Transfer Rate".

The function of the modular computer system (device) 3 in the present embodiment will be described next.

The management technology that is used when changing connections using the I/O interface switch 7 will be used first of all with reference to the flow chart of FIG. 6.

The management server 5 receives a connection instruction for the I/O interface module 8 from the system management server 2 (step S101). The management server 5 searches the I/O interface switch table IFT and the server management table ST, based on the instruction from the system management server 2. The management server 5 creates a condition list JL (See condition list on upper right side of FIG. 6) as requested by the I/O interface module 8 (step S102)

An I/O interface with the same type (for example, FC) as indicated on the condition list JL is then selected from the unassigned I/O interface module management table UNT (step S103) (See table on lower right side of FIG. 6)

An I/O interface with the same specifications (for example Spec. 15) as indicated on the condition list JL is then selected from the unassigned I/O interface module management table UNT (step S104). In the same way, a protocol with the same protocol as indicated in the condition list JL (for example, protocol "FC") is then selected from the unassigned I/O interface module management table UNT (step S105).

An I/O interface connected to the same I/O connection device as indicated on the condition list JL (for example, Disk array device 1: Disk array device 43 of FIG. 1) is then selected from the unassigned I/O interface module management table UNT (step S106).

FIG. 7 shows the related connections of the I/O interface module 8 indicated in the unassigned I/O interface module management table UNT, as seen at the lower right side in FIG. 6.

The management server 5 instructs the I/O interface switch 7 to connect the selected I/O interface to the processor (step S107). The management server 5 instructs the I/O device management server and the network management server to setup the connection using the selected I/O interface (step S108) and rewrites the unassigned I/O interface module management table and the spec management table SPT (step S109).

Here, the I/O device management server is used for managing the input/output devices $4_1$-$4_N$. The I/O device management server is connected to the respective input/output devices $4_1$-$4_N$. The network management server is used for managing the networks Nt1-Nt3. The network management server is connected to the respective networks Nt1-Nt3.

Figure 8:
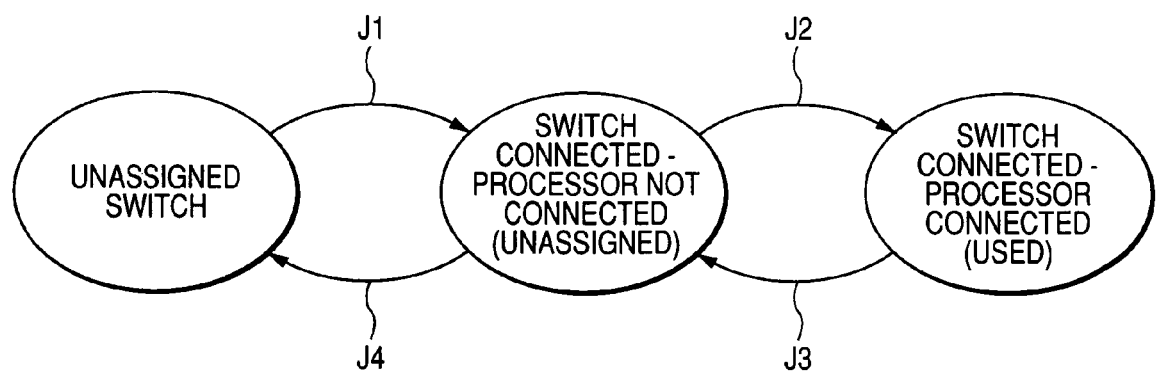
FIG. 8 is a transition state diagram for the input/output (I/O) interface module in the modular computer device installed in the computer system of FIG. 1.

FIG. 8 is a transition state diagram for the input/output (I/O) interface module 8 in the modular computer device 3.

The status J1 in FIG. 8 shows a transition from a state where the I/O interface of the (I/O) interface module 8 is disconnected to a state where the I/O interface is connected (assigned) to an I/O interface switch 7 port, and where the processor module 6 has transitioned to an unassigned state. The status J2 shows the case where the I/O interface has transitioned from state J1 to a state connected (use) to the processor module 6.

The status J3 shows the case where the I/O interface has transitioned from status J2 to a state where the I/O interface is not connected (unassigned) to the processor module 6. The status J4 shows the case where the I/O interface has transitioned from state J3 to a disconnected state.

Figure 9:
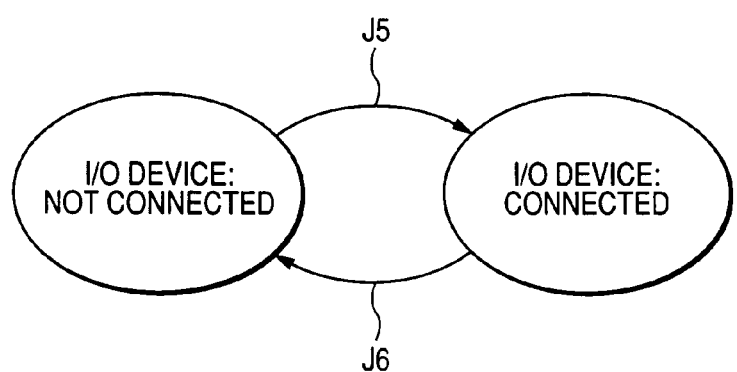
FIG. 9 is a transition state diagram for the input/output (I/O) interface in the modular computer device installed in the computer system of FIG. 1.

FIG. 9 is a diagram showing the transition state in the I/O interfaces $8_1$-$8_N$.

The status J5 shows the case where the I/O interface has transitioned to a connected state (use) from a state where it is not connected (unassigned) to the modular computer system (device). The status J6 shows the case where the I/O interface has transitioned to a non-connected (unassigned) state from the state where it is connected (use) to the modular computer system (device) 3.

The operation of the modular computer system (device) 3 in the states J1-J6 of FIG. 8 and FIG. 9 will be described next with reference to FIG. 10 through FIG. 15.

Figure 10:
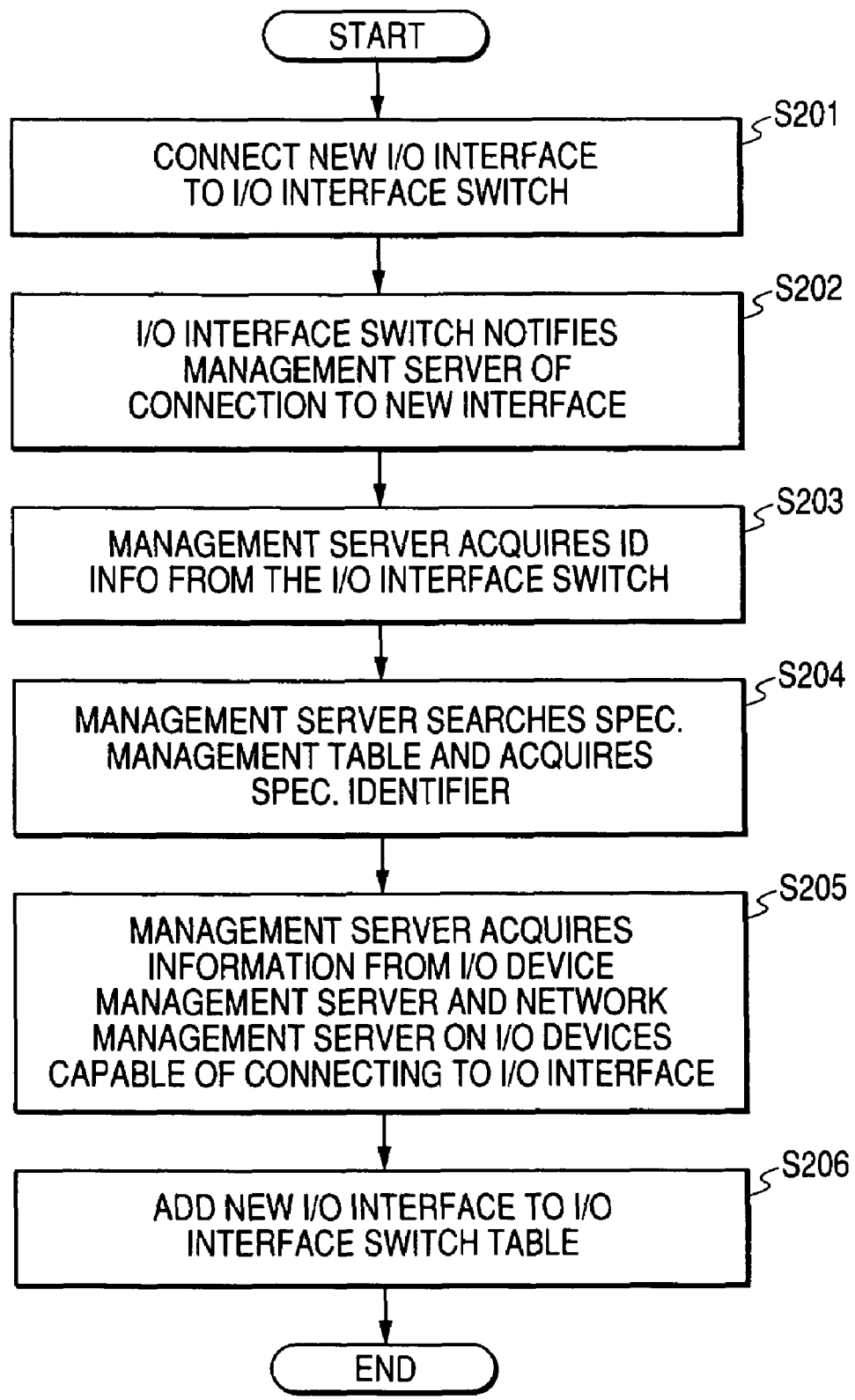
FIG. 10 is a flowchart showing the process flow during the transition in the state J1 of FIG. 8.

FIG. 10 is a flowchart showing the transition to the status J1 in FIG. 8.

When a new I/O interface is connected to the I/O interface switch 7 (step S201), the I/O interface switch 7 first of all, collects information such as the type, slot position, and identifier (MAC address, WWN, etc.) of the connected I/O interface. The I/O interface switch 7 then notifies the management server 5 of this collected information and of the connection of a new I/O interface (step 202).

The management server 5 next acquires characteristic (ID) information on the connected I/O interface from the I/O interface switch 7 (step S203). The management server 5 searches the spec management table SPT of FIG. 5 and acquires the specification identifier (step S204).

The management server 5 then acquires information on I/O devices connectable to the I/O interface module 8 from the I/O device management server and the network management server (step S205).

The management server 5 then adds the newly connected input/output interface to the I/O interface switch table IFT of FIG. 2 (step S206).

Figure 11:
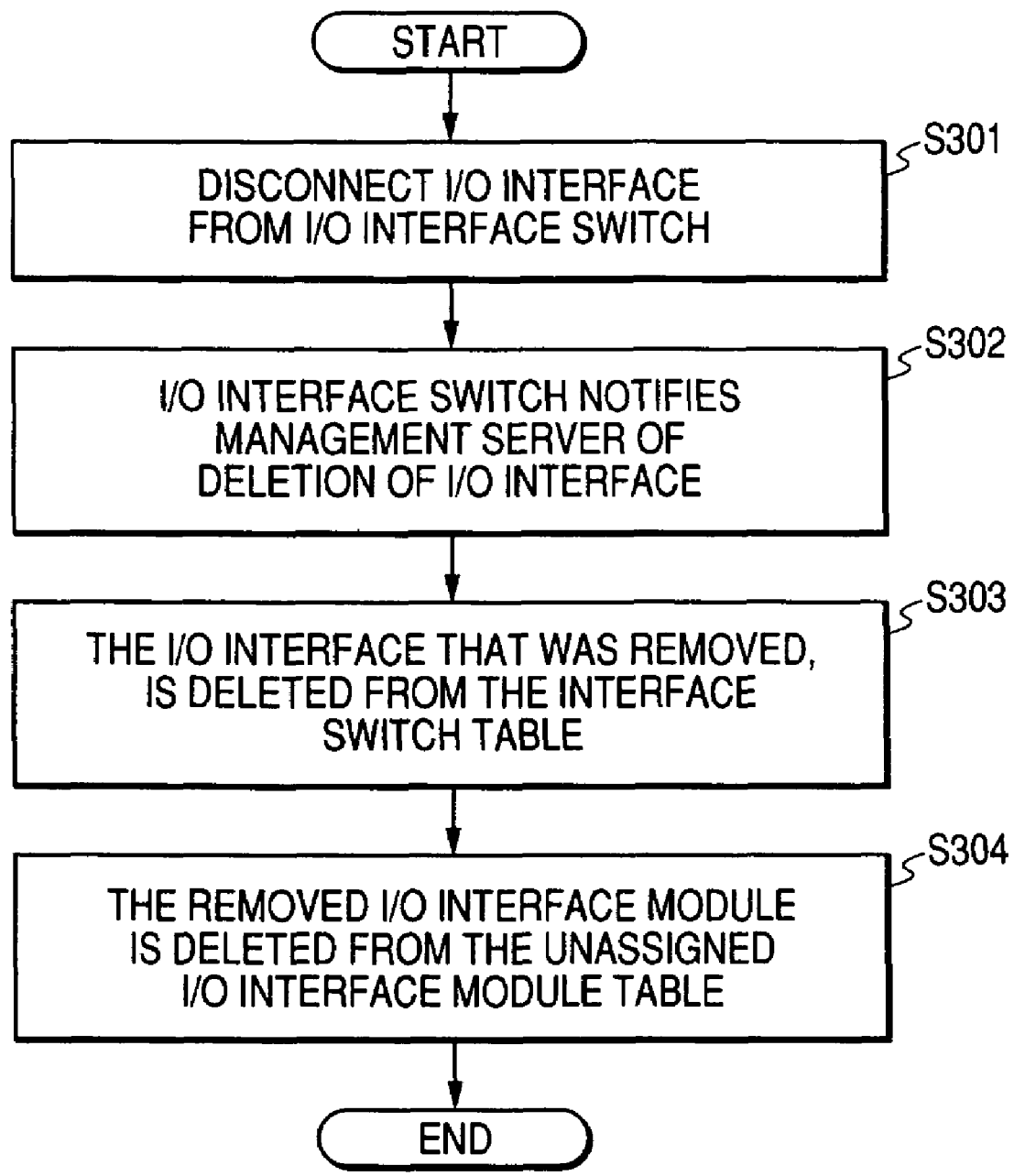
FIG. 11 is a flowchart showing the process flow during the transition in the state J4 of FIG. 8.

FIG. 11 is a flow chart showing the process flow during the transition in the state J4 of FIG. 8.

When the input/output interface is disconnected from the I/O interface switch 7 (step S301), the I/O interface switch 7 first of all notifies the management server 5 that the input/output interface has been deleted (step S302).

The management server 5 then deletes the disconnected I/O interface from the I/O interface switch table IFT of FIG. 2 (step S303). The management server 5 next deletes the input/output interface from the unassigned I/O interface module management table UNT of FIG. 4 (step S304).

Figure 12:
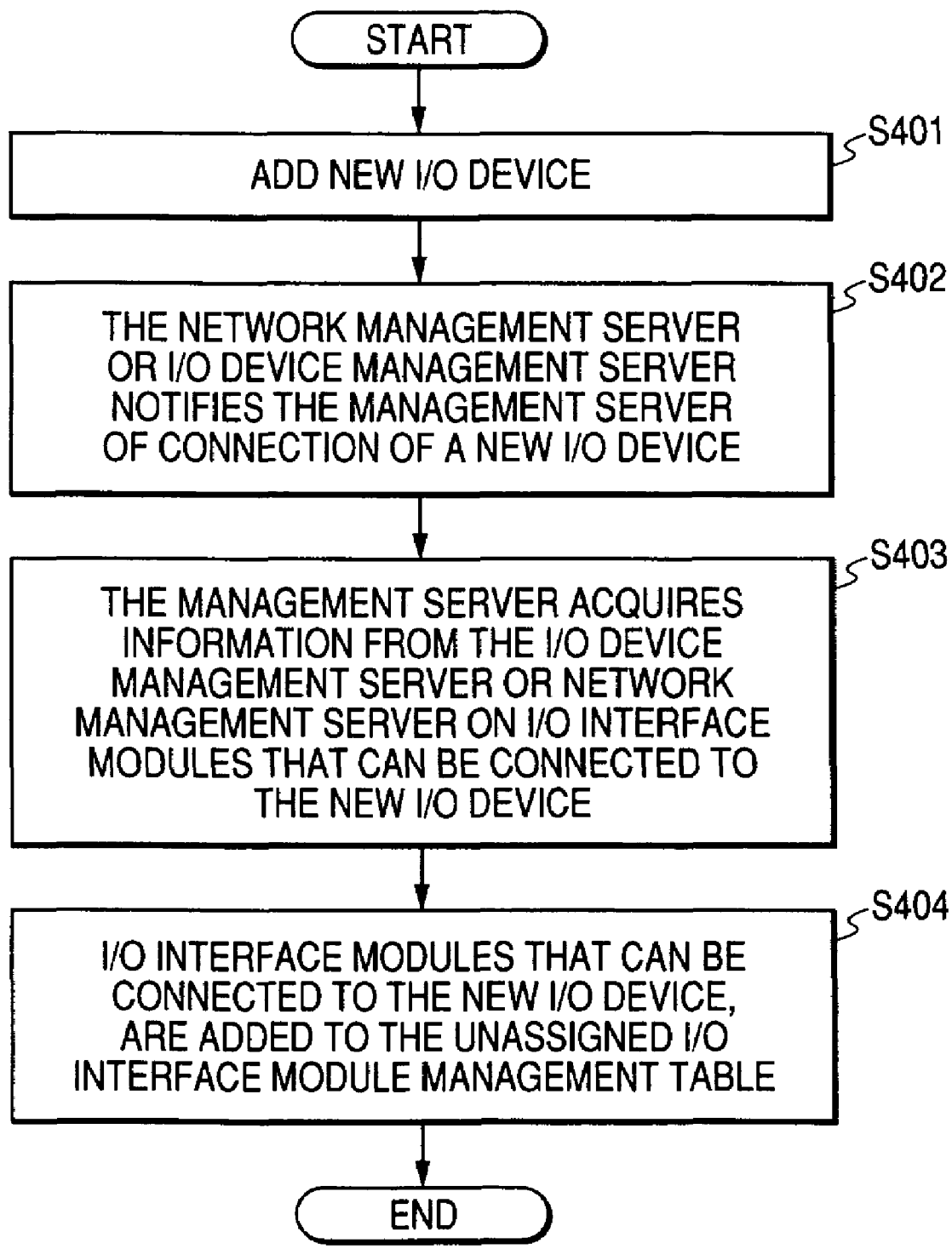
FIG. 12 is a flowchart showing the process flow during the transition in the state J5 of FIG. 9.

FIG. 12 is a flowchart showing the process flow during the transition in the state J5 of FIG. 9.

When a new I/O device is added (step S401), the network 20 management server or the I/O management server notifies the management server 5 that a new I/O device is connected (step S402).

The management server 5 acquires information on the I/O interface from the network management server or the I/O device management server on I/O interfaces that are capable of connecting to the new I/O device (step S403). The management server 5 then adds the connectable I/O interface for that I/O device to the unassigned I/O interface module management table UNT of FIG. 4 (step S404).

Figure 13:
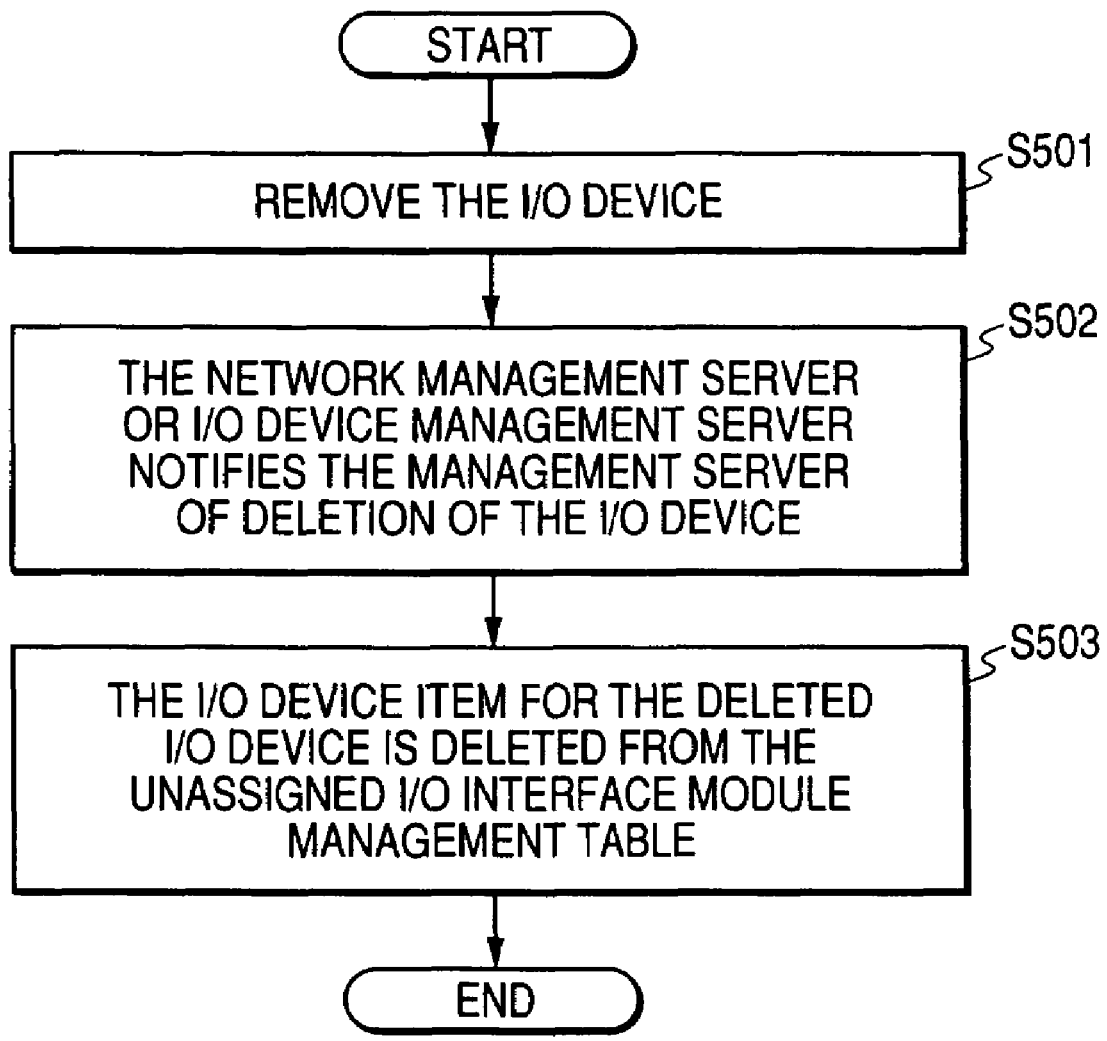
FIG. 13 is a flowchart showing the process flow during the transition in the state J6 of FIG. 9.

FIG. 13 is a flowchart showing the process flow during the transition in the state J6 of FIG. 9.

When the I/O device is disconnected (step S501), the network management server or the I/O device management server then notifies the management server 5 that the input/output device has been deleted (step S502).

Next, the management server 5*a* deletes the item for the I/O device from the unassigned I/O interface module management table UNT of FIG. 4 (step S503).

Figure 14:
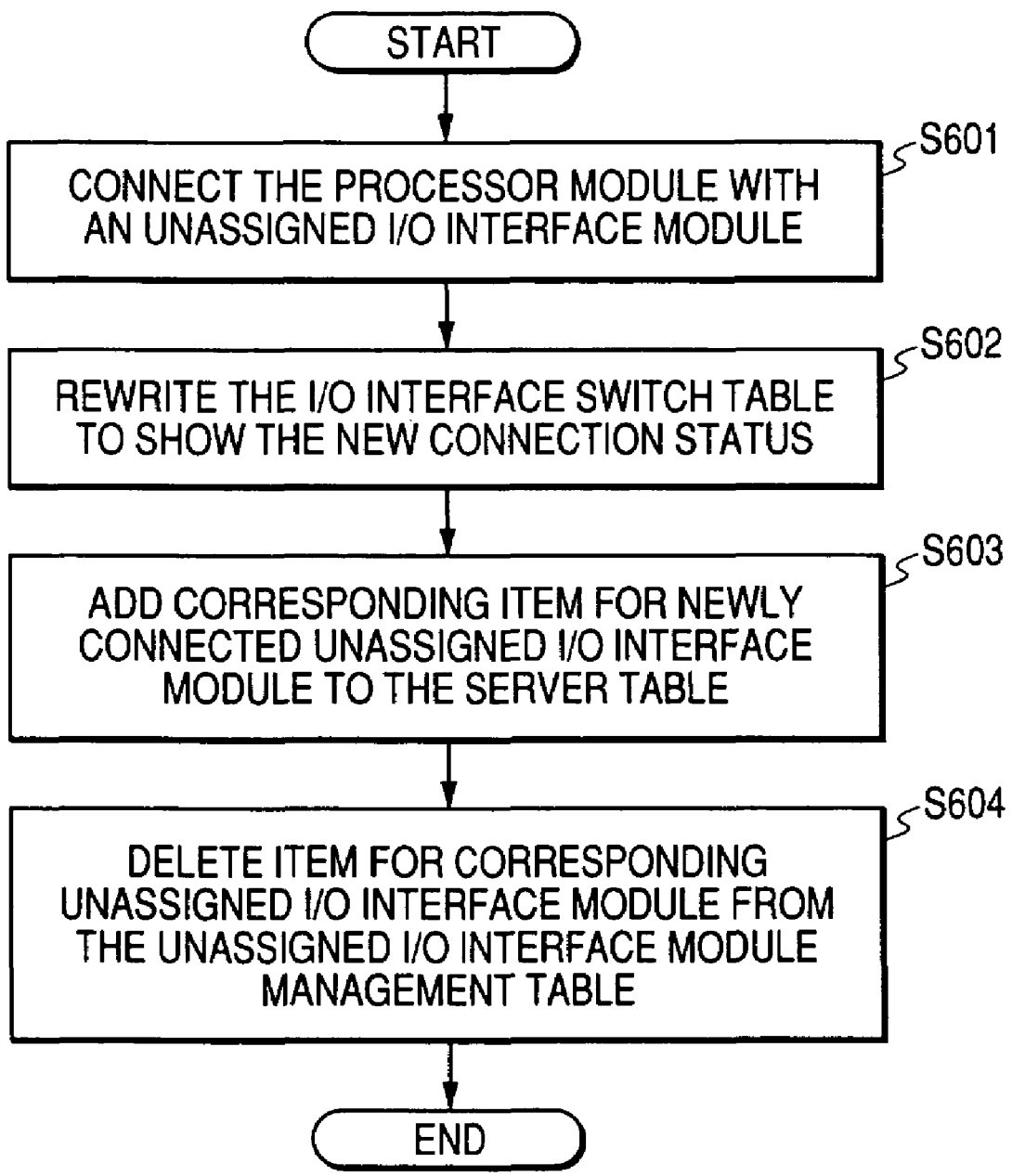
FIG. 14 is a flowchart showing the process flow during the transition in the state J2 of FIG. 8.

FIG. 14 is a flowchart showing the process flow during the transition in the state J2 of FIG. 8.

When the unassigned I/O interface and the processor are connected (step S601), the management server 51 rewrites the information on that new connection relation into the I/O interface switch table IFT (FIG. 2) (step S602).

The management server 5 next adds items relating to the newly connected I/O interface to the server management table ST of FIG. 3, rewrites the information (step S603), and deletes items relating to this I/O interface from the unassigned I/O interface module management table UNT of FIG. 4 (step S604).

Figure 15:
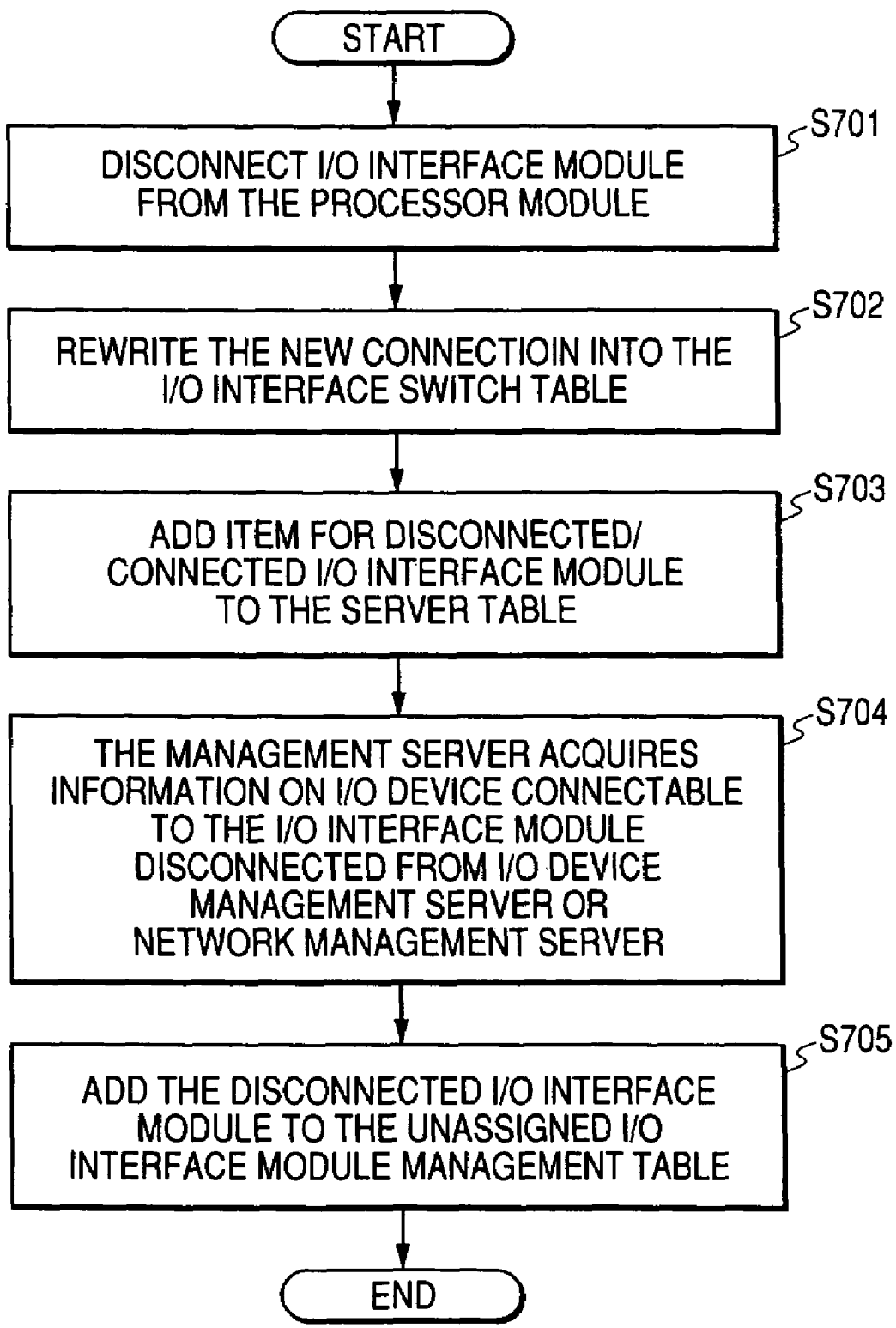
FIG. 15 is a flowchart showing the process flow during the transition in the state J3 of FIG. 8.

FIG. 15 is a flowchart showing the process flow during the transition in the state J3 of FIG. 8.

When the I/O interface is disconnected from the processor (step S701), then the new connection relation is written into the I/O interface switch table IFT (FIG. 2) (step S702).

Next, the management server 5 adds the item relating to the disconnected/connected I/O interface to the server management table ST of FIG. 3 (step S703). The management server 5 then acquires information from the I/O device management server and the network management server on I/O devices connectable to the disconnected I/O interface (step S704). The management server 5 adds the disconnected I/O interface to the unassigned I/O interface module management table UNT (step S705).

Figure 16:
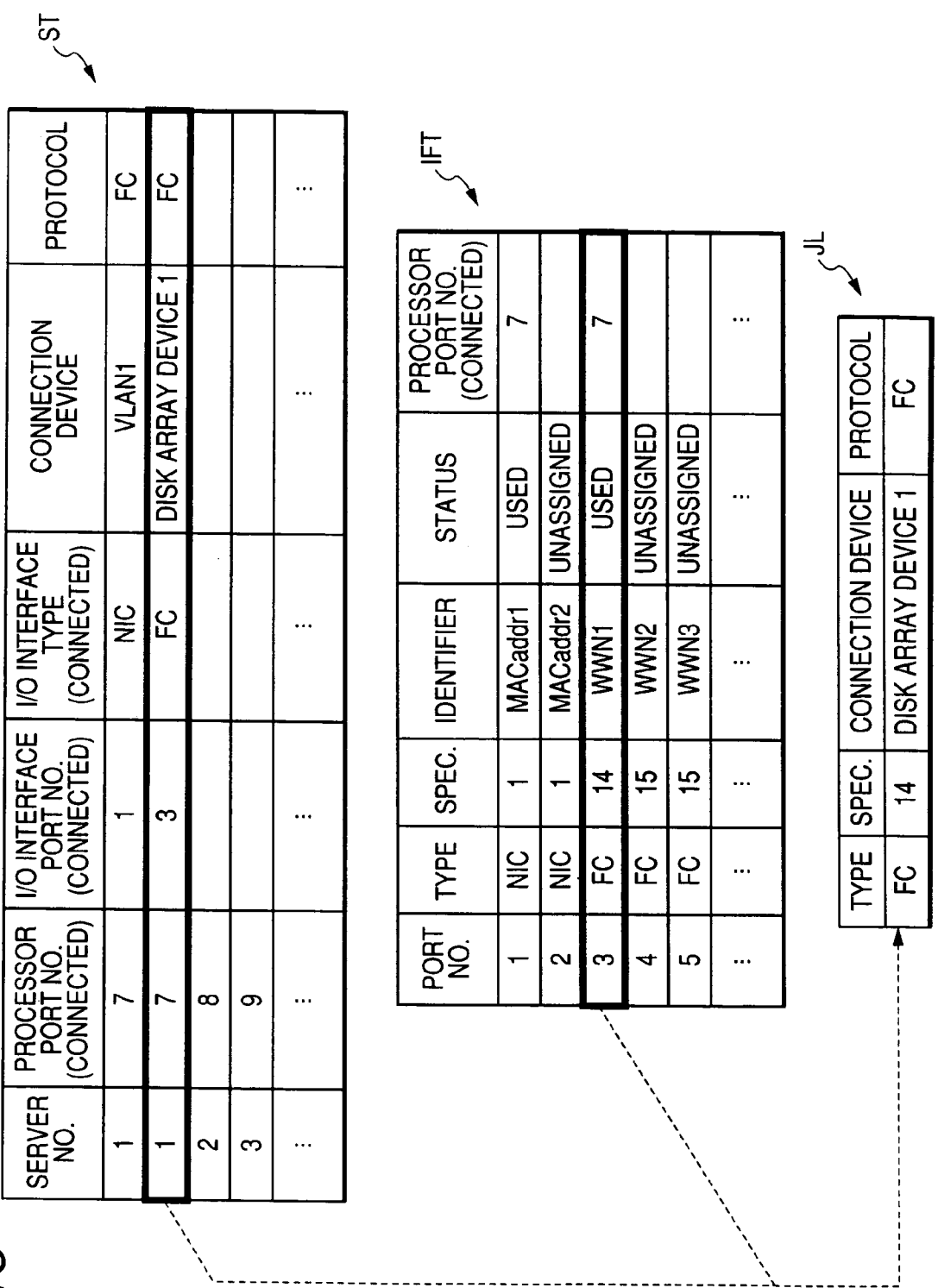
FIG. 16 is a diagram showing the method for creating the condition list by the management server installed in the computer system of FIG. 1.

FIG. 16 is a diagram showing the method for creating the condition list JL of FIG. 6 by the management server 5.

As shown in the figure, the condition list JL is made from the server management table ST, and the I/O interface switch table IFT.

For example, when a conflict occurs on the I/O interface, the system management server 2 requests selection of an I/O interface to serve as a substitute for the I/O interface.

After receiving the selection request from the system management server 2, the management server 5 searches the server management table ST and the I/O interface switch table IFT. The management server 5 then creates a condition list JL indicating the I/O device, the I/O interface type, the specification, and the communication protocol having the same conditions as the I/O interface where the conflict occurred.

The above-described explanation was directed to creation of a condition list JL when a conflict occurred on the I/O interface. However, when a redundant pair, for example, is requested by the system management server 12, a condition list JL may be created and a redundant configuration is created based on the condition list JL.

Figures 17, 18:
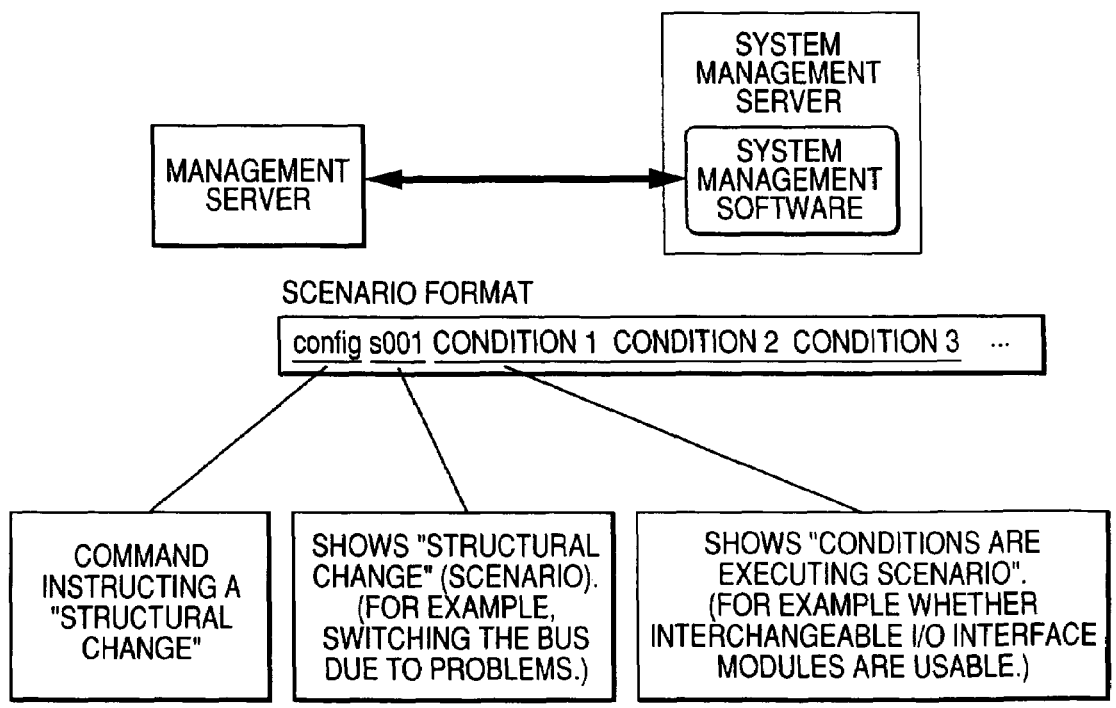
FIG. 17 is a diagram showing one example of the I/O interface module interchangeability table utilized during creation of the condition list of FIG. 16.
FIG. 18 is a diagram showing the protocol for requesting data when sending a request to the management server from the system management server installed in the computer system of FIG. 1.

FIG. 17 shows an example of the I/O interface module interchangeability table GT that is utilized when creating the condition list JL with the management server 5.

In FIG. 16, only a list of I/O interfaces with the same specifications was provided when creating the condition list JL. However, as shown in FIG. 17, the management server 5 may search the I/O interface module interchangeability table GT and select an I/O interface possessing compatible specifications.

FIG. 18 is a diagram showing the protocol used for requesting data when the system management server 2 sends a request to the management server 5.

The requested data is sent, for example, in a text format. The required data is comprised of configuration changes, configuration change contents, and scenario execution conditions.

The above-described configuration change is a command to change the connection configuration, such as 'config'. The configuration change contents consist of configuration changes, such as switching the bus due to conflicts that occur. The cenario for the execution conditions, for example, involves conditions of different types, such whether use of a compatible (interchangeable) I/O interface is acceptable or not.

Figure 19:
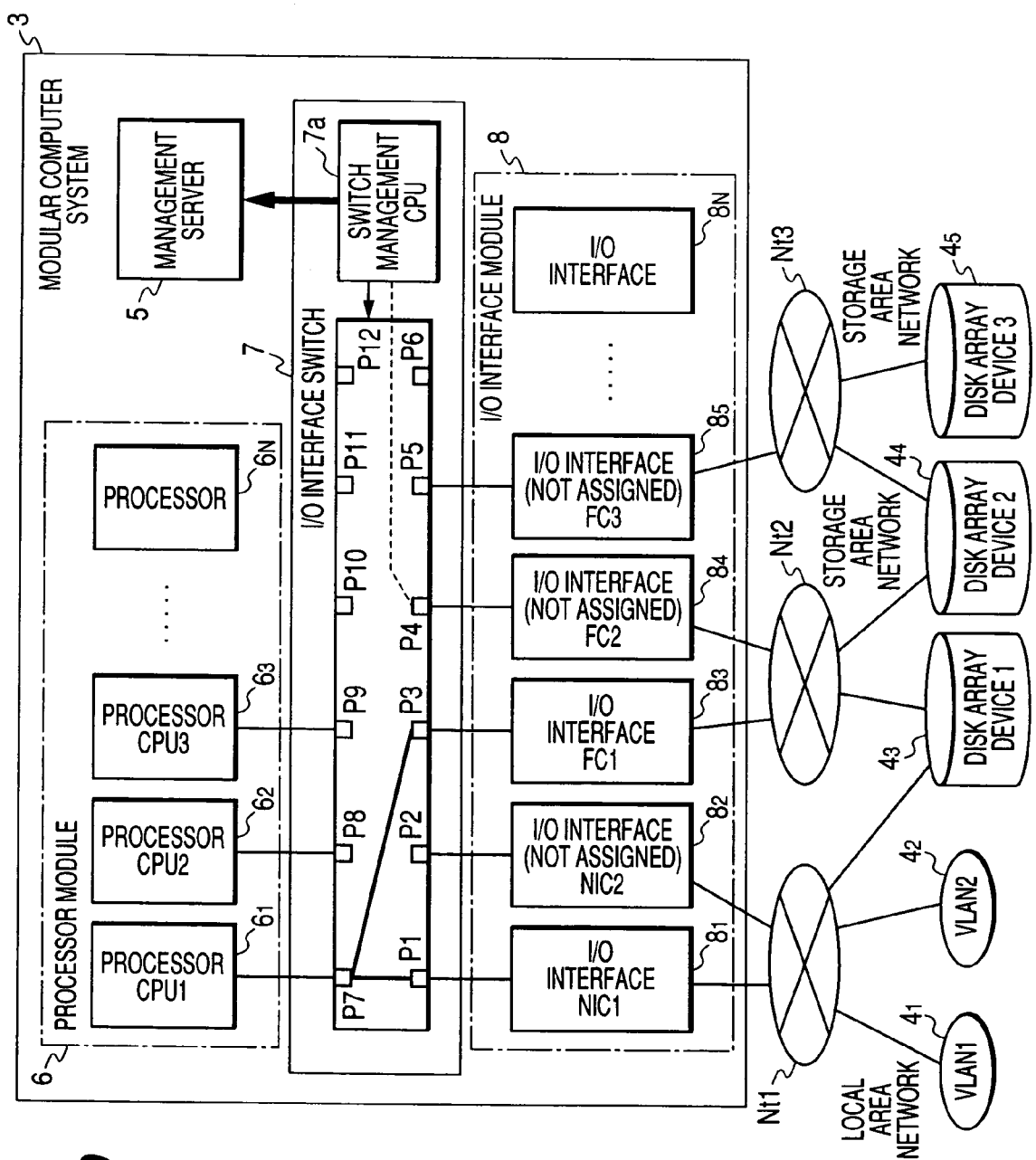
FIG. 19 is a block diagram of a computer system representing another embodiment of the present invention.

FIG. 19 is a block diagram of another structure of the modular computer system 3.

In the structure of this embodiment, a switching processor CPU 7a is newly installed in the modular computer system 3, but in all other aspects, the structure is identical to that in FIG. 1.

The switching processor, 7a is connected, respectively, to the management server 5 and the I/O interface switch 7. The switching processor CPU 7a connects (as yet) unassigned I/O interfaces to the processor, acquires information, such as ID configuration information, for setting the identifier (FIG. 2) and specifications (FIG. 2) of the I/O interface, and sends this acquired information to the management server 5.

This embodiment therefore requires no support for managing the I/O interface module 8, with the result that the management costs and management (maintenance) man-hours can be drastically reduced. The substitute I/O interface used during a conflict (with an I/O interface) may be jointly shared by multiple processors to allow a reduction of the hardware resources, such as I/O interfaces that are held in reserve.

The present invention has been fundamentally described above based on embodiments thereof, needless to say, however, the present invention is not limited to the above-described embodiments and may include a variety of adaptations or modifications without departing from the scope and spirit of the invention.

The method of the present invention for managing input/output interface modules in a computer system is ideal for drastically reducing the operating management load required in modular computer systems.

What is claimed is:

1. A method for managing input/output interface modules for a modular computer system comprising: a plurality of processor modules each containing at least one processor; a plurality of input/output interface modules; and an input/output interface switch for connecting the input/output interface modules and processor modules, and establishing a connection relation between the input/output interface modules and processor modules; and a management server section to control the input/output interface switch and manage the connection relation between the input/output interface modules and the processor modules; and a system management server connected to the management server section, for operating system management software to decide a configuration of the modular computer system; and an input/output device connected directly or by a network to the input/output interface modules, wherein:

the management server section includes a configuration management table for respectively managing input/output interface module specifications and connection status;

when selecting an input/output interface module in an input/output device connection instruction issued by the system management server, the management server section creates a condition list including the input/output device, type of input/output interface module, specifications, and communication protocol in the input/output device connection instruction acquired from the system management server; searches the configuration management table, selects an input/output interface module matching the condition list, instructs the input/output interface switch to change the connection between the input/output interface module and the processor module, and rewrites the configuration management table based on that connection change information;

wherein the configuration management table comprises:

an input/output interface switch table for managing the connection relation between at least the processor module connected to the input/output interface switch, and the input/output interface module;

a server table for managing an individual configuration of at least the modular computer system;

an input/output interface module management table for managing the input/output devices connectable to at least the processor module and the unassigned input/output interface module;

a specification management table for managing at least the specifications of each type of input/output interface module; and when a new input/output interface module is newly added to the input/output interface switch, the input/output interface switch acknowledges connection of the new input/output interface module and notifies the management server section, and the management server section, acquires information of the type, specification, identifier and power supply status of the new input/output interface module from the input/output interface switch, when the connection of the new input/output interface module has been acknowledged, and adds the new input/output interface module to the input/output interface switch table, selects a specification ID from the specifications for the input/output interface module, records the specifications in the input/output interface switch table, acquires information on input/output devices connectable to the input/output interface from a network management server for managing the network and the input/output device management server for managing the input/output devices, and records the input/output device information in the input/output interface module management table.

2. A method for managing input/output interface modules according to claim 1, wherein when one of the input/output interface modules connected to the input/output interface switch is disconnected from the input/output interface switch, the input/output interface switch acknowledges that the input/output interface module has been disconnected and notifies the management server section, and when disconnection of the input/output interface module is acknowledged, the management server section deletes the items for the disconnected input/output interface module from the input/output interface switch table and input/output interface module management table.

3. A method for managing input/output interface modules according to claim 1, wherein when the new input/output device is added, the management server section acquires information from the network management server or the input/output device management server on the input/output interface modules connectable to the new input/output device, and records the information in the input/output interface module management table.

4. A method for managing input/output interface modules according to claim 1, wherein when the one input/output device is disconnected, the management server acquires information from the network management server and the input/output device management server on the disconnected input/output device, and deletes the item relating to the disconnected input/output device from the input/output interface module management table.

5. A method for managing input/output interface modules according to claim 1, wherein when an unassigned input/output interface and processor module are connected in a connection change made by the input/output interface switch, the management server rewrites the input/output interface switch table according to the connection change, rewrites the items regarding the connected input/output device and the input/output interface in the server table, and deletes the appropriate input/output interface module from the input/output interface module management table, and when the input/output interface module that was connected to the processor module has been disconnected, the management server rewrites the input/output interface switch table according to the connection change, rewrites the items about the connected input/output device and the input/output interface module in the server table, and collects information on input/output devices connectable to the disconnected input/output interface module, and adds the change to the input/output interface module management table.

6. A method for managing input/output interface modules according to claim 1, wherein when a conflict has occurred on an input/output interface module, the system management server requests the management server section for a scenario wherein a substitute input/output interface connects to the processor, and the management server section creates a condition list of the required type, specification, communication protocol of the input/output interface and input/output device identical to the input/output interface where the conflict occurred, based on the received scenario.

7. A method for managing input/output interface modules according to claim 1, wherein when constructing a system with a redundant configuration for improving system reliability, the system management server makes a request to the management server section for a scenario to connect the processor to an input/output interface capable of comprising the redundant pair, and the management server section creates a condition list of the respective required type, specification, communication protocol of the input/output interface and input/output device based on the received scenario.

8. A method for managing input/output interface modules according to claim 1, wherein the management server section includes an input/output interface module interchangeability table storing beforehand information on the interchangeability of all the input/output interfaces, and the management server section searches the input/output interface module interchangeability table when selecting an input/output interface, and selects an interchangeable input/output interface from information on the input/output interface specifications even if the interface is a different model or from a different vendor.

9. A method for managing input/output interface modules according to claim 1, wherein when acquiring information on the identifying configuration and identifier of the input/output interface, the input/output interface switch is controlled to connect the input/output interface to the switching control processor of the input/output interface switch, and to acquire information on the configuration space and information on the identifier written in the semiconductor memory, and send the acquired information to the management server section, and after acquiring the information return the input/output interface module to the unassigned state by controlling the input/output interface switch.

10. A method for managing input/output interface modules according to claim 1, wherein the instruction for the scenario sent from the system management server to the management server section is a text format interface.

\* \* \* \* \*